Patented Nov. 11, 1952

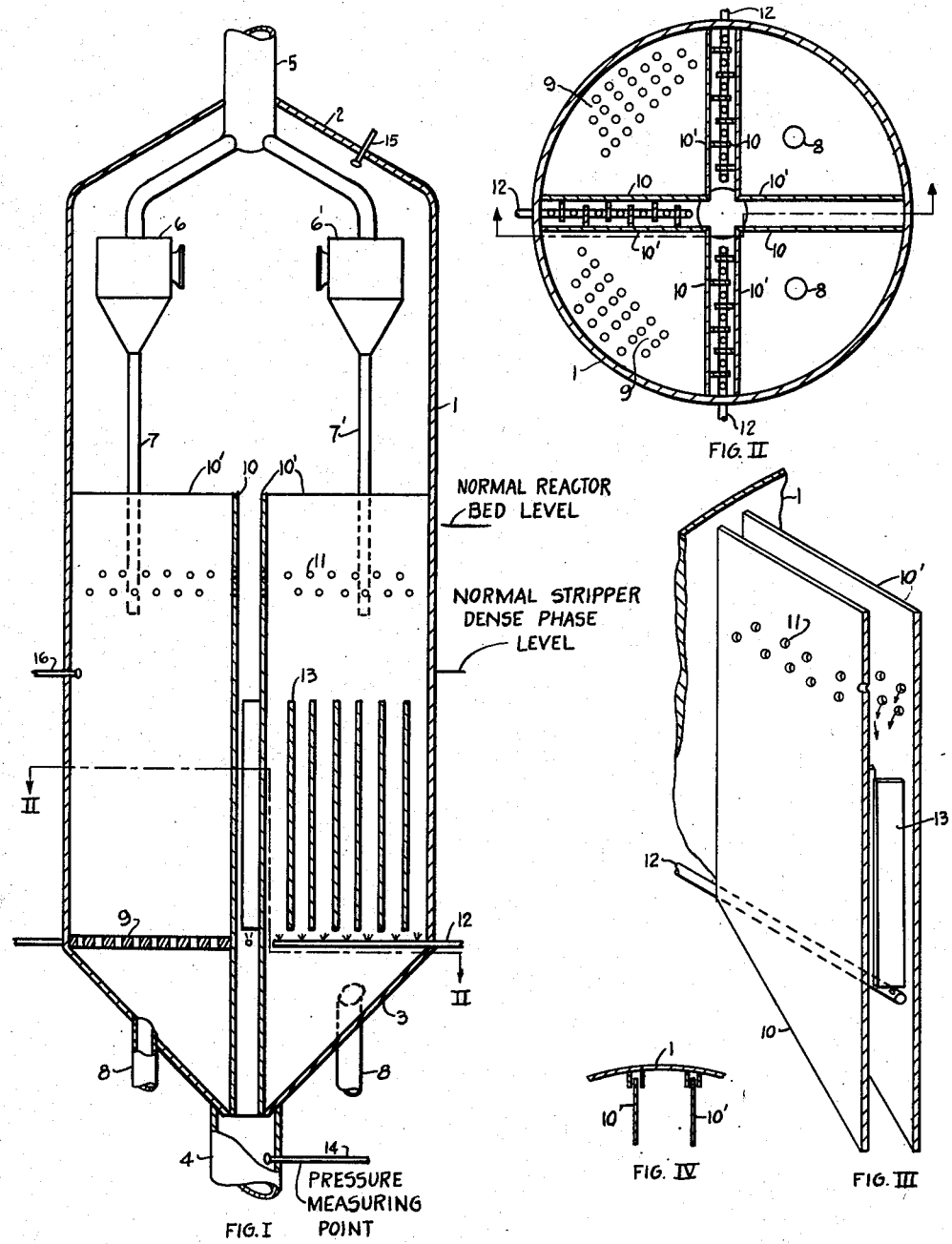

2,617,708

UNITED STATES PATENT OFFICE 2,617,708

PROCESS AND APPARATUS FOR CONTACTING FLUIDIZED SOLIDS WITH GASEOUS FLUIDS

Norman E. Peery, San Francisco, Calif., assignor to Shell Development Company, San Francisco, Calif., a corporation of Delaware Application May 22, 1950, Serial No. 163,477

6 Claims. (Cl. 23—1)

This invention relates to an improved process and apparatus for contacting a gaseous fluid with a continuously replenished bed of fluidized particulate solid. One aspect relates more particularly to the stripping or purging of gaseous fluid from the effluent stream of the fluidized solid by means of a second gaseous fluid.

In many processes it is necessary or desirable to intimately contact a gaseous fluid with a solid material such as an absorbent or catalyst and in such cases many advantages can be obtained by utilizing the so-called fluidized solid technique wherein the gaseous fluid is passed upwardly through a bed of the powdered solid maintained in a fluidized (pseudo liquid) state. This mode of operation is particularly advantageous in cases where continuous operation with continuous replenishment of the solid is desired, and consequently it has come into wide commercial application. This technique is applicable for a large variety of processes such as deodorizing gas, oxidation processes, reduction processes, the benefaction of ores, the gasification of coals, etc., but has so far found widest use in the catalytic treatment of hydrocarbon oils, e. g. the so-called Fluid Catalytic Cracking Process. While this technique offers great advantages, it is relatively inefficient in at least two respects. The first inefficiency is caused by the absence of any substantial concentration gradient in the fluidized bed of solid. This shortcoming was previously known to exist but its importance has not been fully appreciated and no adequate and practical solution has been suggested to overcome it. The reason for the lack of any substantial concentration gradient will be clear when it is considered that in order to maintain the solid in the fluidized (pseudo liquid) state, the velocity of the gaseous fluid must be retained between known relatively narrow limits. The desired time of contact of the gaseous fluid with the solid therefore determines or sets the height, i. e. depth, of the bed of fluidized solid, and, consequently, the horizontal cross section of the fluidized bed must be independently adjusted to handle the desired volume of gaseous fluid to be contacted. In commercial practice this results in large beds. For example, in the catalytic cracking of hydrocarbon oils beds up to 40 ft. diameter are used. The solid material is in a violent state of agitation due to the gaseous fluid "boiling" through the bed; also, in beds of commercial size an internal circulation pattern is set up. As a result, the composition of the gaseous fluid is substantially the same near the inlet (bottom) of the bed and near the exit (top) of the bed. In carrying out a catalytic reaction, therefore, a fluid catalyst bed of commercial size is at a maximum only about three-quarters as efficient as a fixed foraminous bed of the catalyst.

The second shortcoming in the fluidized solid technique as hitherto applied with a continuously replenished bed of the solid lies in the fact that part of the gaseous fluid is withdrawn with the finely divided solid from the bed. In the catalytic treatment of vapors of carbonaceous materials this difficulty is particularly pronounced, firstly, because the amount of material handled is large, e. g. 30 tons of solid per minute, and secondly, because the contaminating carbonaceous material not only represents an appreciable waste, but also greatly increases the regeneration requirements. This problem has been recognized (see U. S. 2,443,190) and numerous arrangements have been suggested to improve the stripping or purging of the withdrawn solid with a second gaseous fluid, e. g. steam. A considerable improvement has been obtained through the use of certain of these suggested arrangements but the problem has not been completely overcome. Due to the inefficiency of the known methods for stripping in a section of the contactor vessel, it is now the practice to stand the expense of providing a separate vessel in which to effect stripping or purging.

The present invention provides a method of operation and an apparatus whereby the fluidized solid technique may be simultaneously improved in a very simple manner with respect to both of the described shortcomings. Broadly speaking, this desired object is achieved by the proper combination of four factors which are:

1. Effecting the stripping in such a manner that interstitial gaseous fluid is largely removed while the solid falls freely through an uprising stream of the stripping gas, and then stripping the more tenaciously held material while the solid is in the fluidized (dense phase) condition;

2. Effecting the stripping in a zone having a long and narrow cross section;

3. Feeding the solid to be stripped from the fluidized bed through orifices into the stripping zone from both sides thereof to produce a more uniform curtain of the falling solid and to utilize the stripping space more efficiently; and 4. Arranging the stripping zone in such a manner as to divide the main bed of fluidized solid into a plurality of separate and distinct parallel beds having a higher ratio of depth to horizontal cross section.

How these factors are combined to improve both the contacting and the stripping will be clear from the following description of one modification of suitable apparatus as applied to one specific process, namely, the catalytic cracking of a hydrocarbon oil with a powdered cracking catalyst. It will be understood, that the method and apparatus are not restricted in their useful application to catalytic cracking nor to the treatment of oils, and that this operation has been chosen merely as a suitable example.

In the accompanying drawing, Figure I shows the elevation in section of one suitable contacting vessel arranged to embody the principle of the invention. The plane of the section Figure I is indicated by the dot-dash line I—I in Figure II. Figure II shows the plan of the same vessel in section. The plane of the section Figure II is indicated by the dot-dash line II—II in Figure I. Figure III is an oblique view of part of the perforated plate arrangement of the same vessel. Figure IV is a detail of one suitable construction for mounting the perforated plates.

Referring to the drawing Figures I and II, the contactor comprises an outer cylindrical shell 1 having conical top and bottom closures 2 and 3. The contactor is provided with a withdrawal line 4 at the bottom for removing the spent and stripped catalyst and, also, with a withdrawal line 5 at the top for withdrawing the contacted hydrocarbon vapors. The apparatus may be provided with cyclone separators 6 and 6' to remove small amounts of solids entrained in the outgoing vapors. The solids separated in the cyclone separators are returned to the catalyst beds by the cyclone dip legs 7 and 7'. The apparatus is also provided with at least two inlet lines for the oil vapors to be contacted. In the apparatus illustrated there is one such inlet line 8 for each quadrant, or a total of four. The apparatus is also preferably provided with some means for distributing the incoming vapors over the horizontal cross sections of the fluidized beds of catalyst. In the apparatus illustrated the distribution is effected by grid plates 9 in each quadrant.

As seen from Figure II the contactor is divided into a plurality of separate sections, in this case four, by pairs of plate members 10 and 10'. These pairs of plates extend from the bottom of the vessel up to a point above the normal working level of the fluidized beds in the reactor and are arranged as indicated to provide at least one stripping zone between them of narrow substantially rectangular cross section. The plates 10 and 10' are perforated near the top at a level below the normal bed level in the contacting sections and above the normal dense phase level in the stripping section.

In order to allow for thermal expansion, the plates 10 and 10' are preferably attached to the shell 1 by a means allowing some movement. One suitable arrangement is illustrated in the detail Figure IV.

The apparatus is provided with suitable means for injecting a stripping medium, e. g. steam, into the stripping zone between the pairs of plates. In the case illustrated, four perforated pipes 12 are provided for this purpose.

The stripping zone is preferably provided with baffles 13. These baffles are preferably arranged to substantially divide the stripping zone in part of its length into a number of vertical passages. They are preferably attached to only one plate, either 10 or 10', in order to allow for thermal expansion.

The distance between the plates 10 and 10' will depend in any case upon the size of the vessel and the desired rate of replenishment and may vary from about 1 ft. up to about 6 ft. In any case, however, the cross section of the stripping section between the plates is less, and usually much less, than the cross section of any of the other sections and the zone is as narrow as possible, consistent with the size of the vessel and the desired flow rate. A suitable distance between the plates may be calculated in any given case in the same manner as that used to calculate the cross sections of conventional peripheral stripping sections.

The holes 11 near the top of the plates are preferably more or less evenly spaced along the width of the plates and are of such size and number as to accommodate the desired flow of the catalyst. In a typical case where the plates are 2 ft. apart each plate is provided with 12 holes of $2\frac{5}{16}$ inch diameter. If the plates are further apart, somewhat larger holes are preferred so that the incoming solid streams a greater distance.

In the apparatus illustrated, the horizontal cross section of the vessel is divided into four parallel contacting sections separated by the cross-shaped narrow stripping zone between the plates. It is essential that the pairs of plates define a relatively narrow stripping zone and that they divide the cross section of the vessel into at least three zones, i. e., at least two contacting zones separated by the stripping zone. On the other hand, it is to be understood that the pairs of plates may divide the vessel into either more or less than four contacting sections and that the pairs of plates do not need to be straight as illustrated. For example, the pairs of plates may have a horizontal section which is slightly S-shaped, slightly bowed, or slightly V-shaped. These shapes are more difficult to fabricate but, on the other hand, they have the advantage of being able to flex more easily to accommodate differences in thermal expansion.

The operation of the apparatus is as follows: the four separate contacting sections above the grids 9 are filled with finely divided cracking catalyst up to a level above the perforations 11 (e. g. 1-5 ft. above) but below the top of plates 10 and 10' and the oil vapors carrying suspended catalyst are passed into the contacting sections by the four lines 8 and grid plates 9. Different oils may be simultaneously treated if desired. Finely divided catalyst immediately spurts through the holes 11 into the narrow stripping zone from both sides thereof, and the spray of catalyst falls freely downward against the stream of steam or other stripping gas introduced into the stripping zone by the four perforated pipes 12. The pressure is measured near the bottom of the stripping zone and near the top of the contacting vessel and the differential pressure is caused in the known manner to control a suitable valve in line 4 (not shown). Pressure measuring taps 14 and 15 show suitable locations. The control is regulated to maintain a dense (fluidized) phase in the stripping zone up to the desired level. The level is maintained at least one foot below the perforations in the plates 10 and 10' and preferably between about 2-5 ft. below the level of the perforations. The level may be dropped somewhat if desired but it should not be lowered to such an extent that no substantial dense phase exists in the stripping zone between the plates. The control of the catalyst levels in the stripping zone and the contacting zone through differential pressure may be advantageously carried out as described in U. S. patent application Serial No. 593,625 filed May 14, 1945. Pressure measuring tap 16 is used with tap 15 to control the level of the fluid bed in the reactor sections.

When operating as described, the spent catalyst is first stripped of occluded vapors while freely falling from the holes 11 to the dense bed in the stripping section. Since the catalyst flows in a plurality of streams through restricted orifices into the narrow stripping zone from opposite sides thereof (the streams may even impinge) the space in the stripping zone is effectively utilized and the catalyst is sufficiently stripped of occluded vapors even in the short space of about 2 ft. This then allows a substantial volume (substantial contact time) for the removal of absorbed material by stripping in the dense phase which occupies the lower portion of the stripping zone. If the catalyst is introduced from only one side, or is introduced by flowing over a weir, no substantial contact with the uprising stripping vapors is obtained and such improvement as is obtained is primarily through avoiding intermixing of the catalyst between the stripping zone and the contacting zone. The avoidance of such intermixing is important but in itself does not afford the advantages of the method and apparatus of my invention.

I claim as my invention:

1. An apparatus for contacting a gaseous fluid with a continuously replenished particulate solid which comprises in combination a vertically disposed shell having top and bottom closures, partitioning means extending upwardly from the bottom of the vessel to a point short of the top thereof comprising at least one pair of substantially parallel narrowly spaced plate members each having a plurality of open perforations near the top, said means dividing the lower portion of the vessel into at least three open-topped sections otherwise completely isolated from each other within the vessel except through the aforesaid perforations, one of said sections being a narrow one between said plates, means for injecting a gaseous fluid near the bottom of said narrow section between said substantially parallel plate members and separate means at the bottom for withdrawing fluidized solid from said section, an inlet line and gaseous fluid distributing means near the bottom of each of the other sections, and an outlet line at the top adapted to withdraw gaseous fluid issuing upwardly from each of said sections.

2. Apparatus according to claim 1 further characterized in that said substantially parallel plate members extend from wall to wall of said shell substantially across the diameter.

3. Apparatus according to claim 1 further characterized in that substantially vertical baffles substantially normal to said plate members divide the narrow section between said plate members into a row of cells having open tops and bottoms.

4. Apparatus according to claim 1 further characterized in that said bottom closure is conical.

5. The improved method for contacting a gaseous fluid with a continuously replenished particulate solid which comprises passing the gaseous fluid to be contacted in a plurality of separate parallel streams up through separate beds of the said solid maintained in a fluidized condition, said beds defining contacting zones separated by a stripping zone, passing a second gaseous fluid stripping medium up through said stripping zone, withdrawing gaseous fluid after passing through separate beds along with said stripping medium as a common stream, passing fluidized solid from a plurality of points below the surface of each of said beds into opposite sides of said stripping zone, withdrawing fluidized solid from the bottom of said stripping zone at a rate to maintain a level of fluidized solid in said stripping zone from 2 to 5 ft. below the level of introduction of said fluidized solid into said stripping zone thereby to cause the said solid to enter said stripping zone between said beds from a plurality of points in opposite direction and to freely fall said distance through said second gaseous fluid stripping medium.

6. The method according to claim 5 further characterized in that the level of fluidized solid in said contacting zone is maintained from 1 to 5 ft. above the said plurality of points at which the fluidized solid is passed into said stripping zone thereby to cause the separate streams of fluidized solid entering the stripping zone from opposite sides thereof to stream toward each other.

NORMAN E. PEERY.

REFERENCES CITED

The following references are of record in the file of this patent:

UNITED STATES PATENTS

| Number | Name | Date |
| --- | --- | --- |
| 2,440,620 | Taff | Apr. 27, 1948 |
| 2,454,373 | Blanding | Nov. 23, 1948 |
| 2,467,850 | Ogorzaly | Apr. 19, 1949 |
| 2,477,042 | Burnside | July 26, 1949 |
| 2,521,195 | Wheeler, Jr. | Sept. 5, 1950 |
| 2,530,645 | Bockman | Nov. 21, 1950 |
| 2,541,186 | Anderson | Feb. 13, 1951 |